United States Patent [19]
Bechtold et al.

[11] Patent Number: 5,766,798
[45] Date of Patent: Jun. 16, 1998

[54] PRISMATIC GALVANIC CELL HAVING A CURRENT TOPPING LUG

[75] Inventors: Dieter Bechtold, Bad-Vilbel; Klaus Brandt, Wiesbaden; Dietrich Bartke, Kelkheim; Jörg Kümpers, Eppstein; Frank Mengel, Ebsdorfergrund; Jürgen Vollbert, Hattersheim, all of Germany

[73] Assignee: Varta Batterie Atkiengesellschaft, Hanover, Germany

[21] Appl. No.: 708,180

[22] Filed: Sep. 6, 1996

[30] Foreign Application Priority Data

Sep. 30, 1995 [DE] Germany .............. 195 36 684.0

[51] Int. Cl.$^6$ .................................................. H01M 4/64
[52] U.S. Cl. .............. 429/211; 429/160; 429/240; 429/243
[58] Field of Search .................. 429/152, 160, 429/158, 178, 161, 211, 170, 240, 243, 244

[56] References Cited

U.S. PATENT DOCUMENTS

| | | | |
|---|---|---|---|
| 383,640 | 5/1888 | Gibson | 429/243 |
| 5,230,967 | 7/1993 | Radmall | 429/152 |
| 5,476,734 | 12/1995 | Pulley et al. | 429/244 |

FOREIGN PATENT DOCUMENTS 0111643  6/1984  European Pat. Off. .

*Primary Examiner*—M. Nuzzolillo
*Attorney, Agent, or Firm*—Weiser and Associates, P.C.

[57] ABSTRACT

A prismatic galvanic cell having a large number of electrode pairs separated by separators is provided with electrode plates having current tapping lugs which extend from upper or lateral edges of the plates, and which include flexible tongues extending along and parallel to the plate edges. The flexible tongues of grouped electrode plates of the same polarity are connected to the terminal posts of the cell in a manner which precludes short circuiting and which accommodates the increased bending stresses typical of such cells.

16 Claims, 3 Drawing Sheets

5,766,798

1

PRISMATIC GALVANIC CELL HAVING A CURRENT TOPPING LUG

BACKGROUND OF THE INVENTION

The present invention generally relates to prismatic galvanic cells, particularly those containing a significant number of electrode pairs.

EP-A-0 111 643 discloses an alkaline battery having cells which contain a relatively large number of electrode pairs. Separators are appropriately positioned between adjacent plates, in conventional fashion. Electrodes of the same polarity are in each case connected in parallel, and the parallel-connected, negative and positive electrode plates are in turn connected to terminal posts which extend through the wall of the cell. The individual cells are advantageously connected in series by connecting the terminal posts (of opposite polarity) of adjacent cells.

In cases where the individual cells contain a large number of electrode plates, the current tapping lugs of the electrode plates which are at a greater distance from the associated terminal post tend to be exposed to higher bending stresses. For this reason, the length of such lugs must be greatly increased. However, such lengthening of the lugs (to avoid increased bending stresses) is achieved either by preforming the lugs or by enlarging the terminal (or head) region, which are unfavorable conditions. For example, preforming of the lugs results in increased labor costs for assembling the cells, and lengthening of the lugs impairs the cell's volume capacity (typically expressed in Wh/l).

SUMMARY OF THE INVENTION

It is therefore the primary object of the present invention to increase the volume capacity of prismatic cells having larger numbers of electrode pairs.

It is also an object of the present invention to simplify the assembly of prismatic cells, while reducing the risk of short circuits between electrode plates of opposite polarity.

These and other objects which will become apparent are achieved in accordance with the present invention by providing the electrode plates of a prismatic cell with current tapping lugs which are formed as flexible tongues, defined by recesses in the upper or in the lateral edges of each plate, which extend generally parallel to the associated (upper or lateral) plate edges. The ends of the flexible tongues of the electrode plates of same polarity (all or groups) are in turn connected to their respective terminal posts. Such current tapping lugs make it possible to connect up to about 50 electrode plates (of one polarity) to the terminal post without requiring additional space for the resulting connection. The risk of a short circuit between electrode plates of opposite polarity is also reduced as a result.

For further discussion of the improvements of the present invention, reference is made to the detailed description which is provided below, taken in conjunction with the following illustrations.

2

Figure 4:
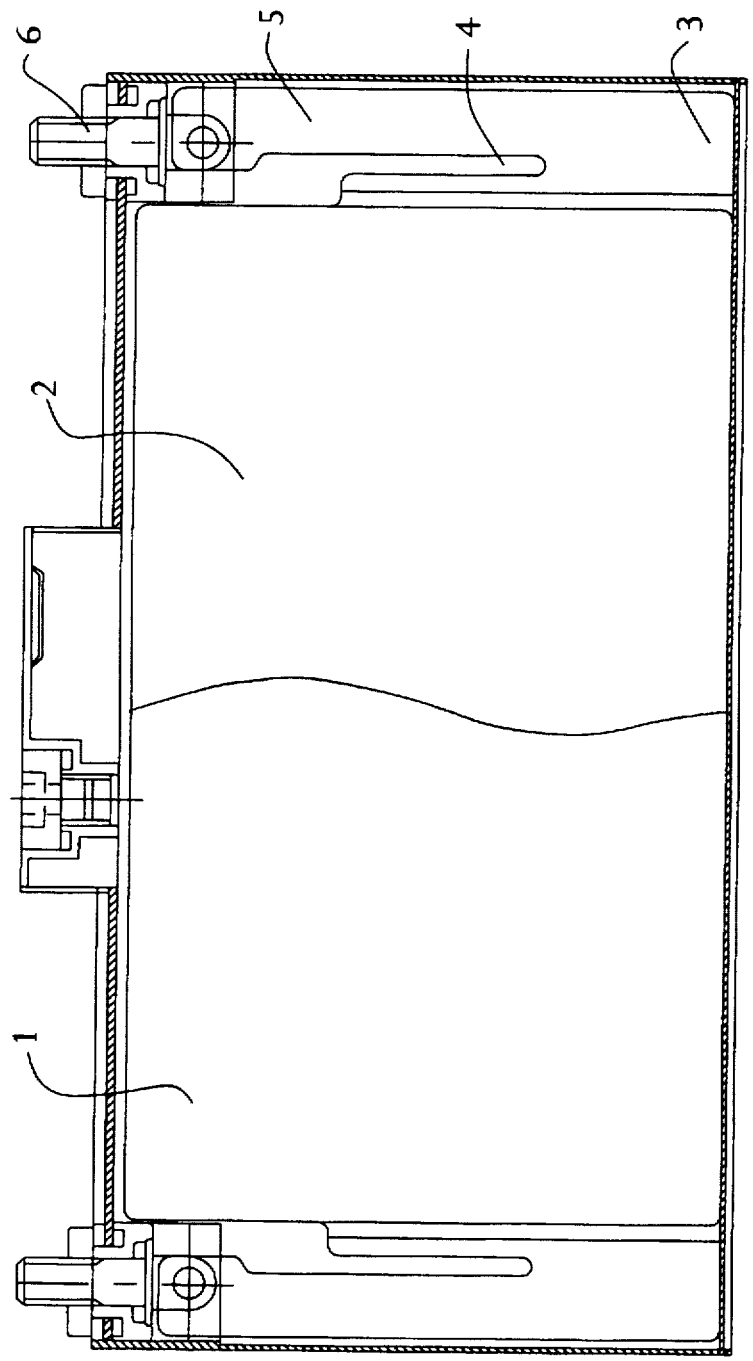

FIG. 4 is a longitudinal cross-sectional view of a cell having current tapping lugs situated on opposite sides of the electrode plates.

DETAILED DESCRIPTION OF PREFERRED EMBODIMENTS

Figures 1, 2:
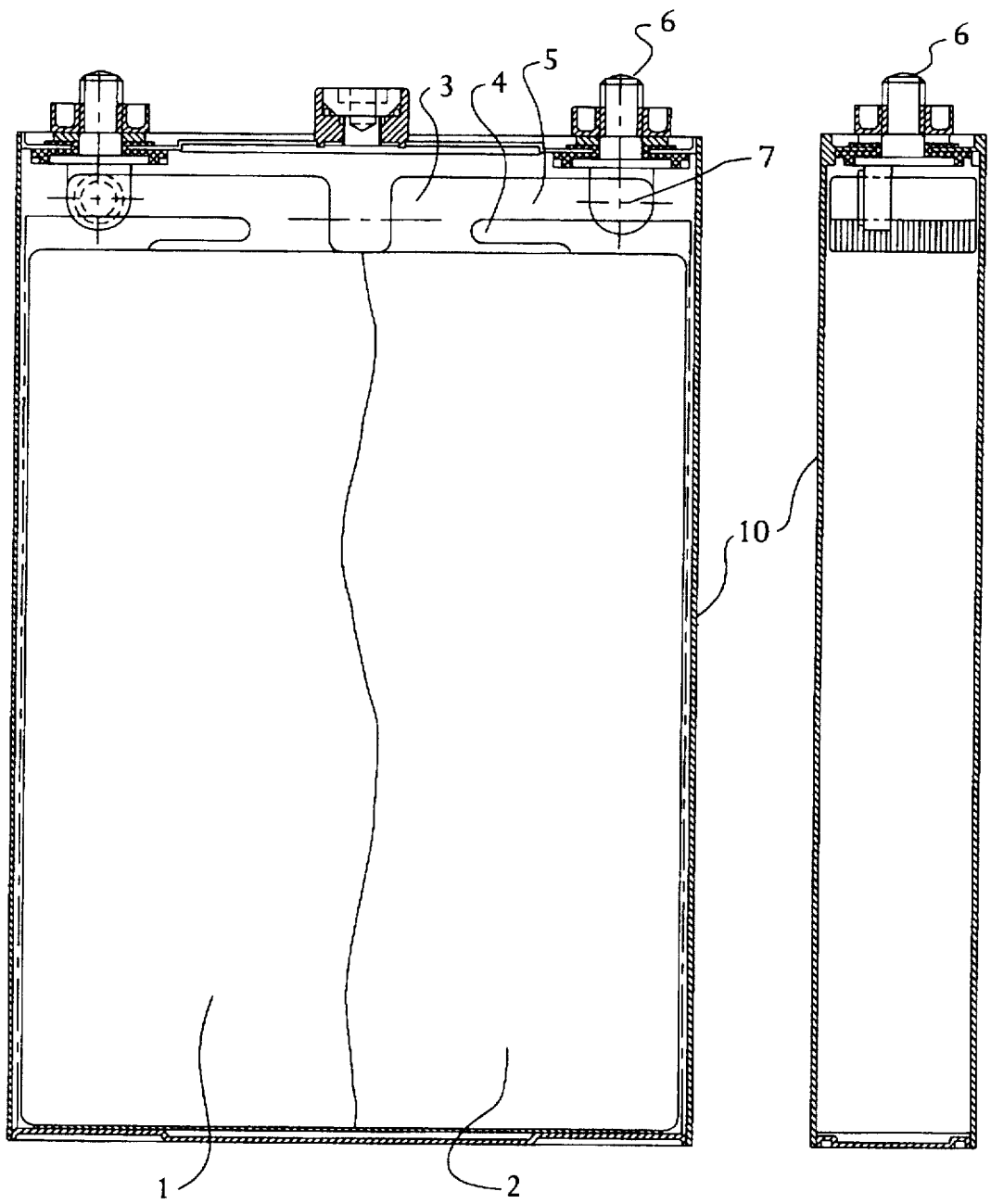
FIG. 1 is a longitudinal cross-sectional view of a cell having current tapping lugs situated on upper edges of the electrode plates.
FIG. 2 is a transverse cross-sectional view of the cell construction of FIG. 1.

FIGS. 1 and 2 show a prismatic cell 10 having electrode plates 1, 2 provided with a first embodiment of the current tapping lugs 3 of the present invention. As is usual for prismatic cells, the cell 10 has a relatively large number of electrode plates 1, 2 arranged in series. Separators are appropriately positioned between the plates 1, 2, in usual fashion.

Each of the electrode plates 1, 2 has a current tapping lug 3 which begins approximately in the center of the plate, and which extends along the upper edge of the plate toward one of the lateral edges. The lugs 3 of the plates 1 of one polarity extend toward one side of the series of plates, while the lugs 3 of the plates 2 of opposite polarity extend toward the opposite side of the series of plates, as shown.

The lugs 3 of the electrode plates 1, 2 are spaced from the center line of the plates 1, 2, and accordingly, the center of the upper plate edges. As a result, short circuiting between the positive and negative lugs 3 is effectively precluded. The lugs 3 are shaped to define recesses 4 along the upper plate edges, producing flexible tongues 5 which extend generally parallel to and above the upper plate edges. The flexible tongues 5 operate to accommodate the increased bending stresses typical of such cell constructions. The ends 7 of the flexible tongues 5 are connected to their respective terminal posts 6, preferably by ultrasonic welding.

Figure 3:
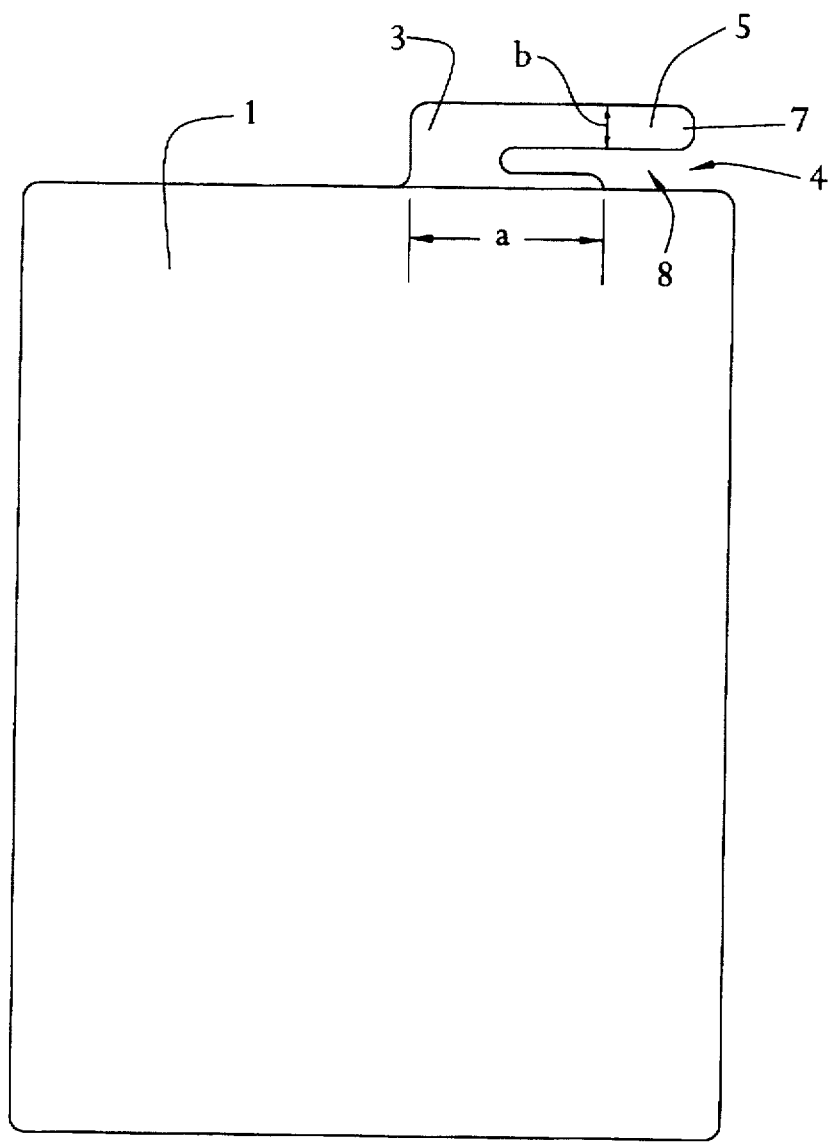
FIG. 3 is a plan view of an electrode plate used in the cell construction shown in FIGS. 1 and 2.

FIG. 3 shows one of the electrode plates 1, 2 used in the cell construction of FIGS. 1 and 2, illustrating the recess 4 which operates to define the flexible tongue 5. As shown, the recess 4 is advantageously made wider near the end 7 of the flexible tongue 5 (at 8) than along the remaining (in-board) regions of the lug 3. Such broadening tends to reduce the risk of short circuiting in the vicinity of the terminal posts 6 because a sufficiently large distance is provided between the adjacent edges of the electrode plates and the terminal posts so that deviations during assembly, or shifting of the electrode plates, will not cause a short circuit.

The lugs 3 of the negative and positive electrode plates 1, 2 of the cell construction of FIGS. 1 and 2 are preferably arranged to extend from a position near the center of the upper plate edges, toward the opposite ends (lateral edges) of the series of plates. This arrangement is preferred if the electrode plates are substantially square, or if the electrode plates have a ratio of plate width to plate height (width/height) less than one. When the ratio of plate width to plate height (width/height) is greater than one (or if desired, when the plates are substantially square), the lugs 3 of the negative and positive electrode plates 1, 2 are preferably arranged on opposite sides (edges) of the electrode plates. Such a cell construction is shown in FIG. 4 of the drawings. The arrangement selected (top or side) is freely variable, and is responsive to the above-mentioned conditions to in each case permit the most favorable utilization of volume, and therefore achieve the greatest possible volume capacity.

The electrode plates of the present invention are especially useful in nickel-metal hydride or lithium-ion cells. In such cells, rolled expanded metal electrodes formed of copper, nickel, nickel-plated steel or aluminum, and foam or felt electrodes formed of nickel, nickel-plated copper or nickel-plated steel, are used as carriers of the active electrode material.

The lugs 3 are advantageously formed as an integral part of the carrier material of the electrode plates. However, a separate current conducting material may be affixed to the electrode plates, as an alternative. In such case, the material forming the lug 3 is preferably welded to a strip (edge) of the electrode plate which is free of electrode mass (e.g., when formed as a continuous ribbon).

The current-conducting structures of the electrodes preferably have thicknesses on the order of 100 to 500 μm. The resulting thickness of an electrode pair including a positive and negative electrode plate, and the corresponding separators, will be about 1 mm. As a result, 20 to 40, and preferably 25 to 30 electrode pairs can be installed in each cell.

In order to assure high mobility of the lugs 3, the flexible tongues 5 are preferably dimensioned so that their length is about ⅓ to ⅘ of the length of the corresponding edge of the electrode plate. The current conducting capacity of the lugs 3 is adjustable by varying the ratio (referring to FIG. 3) of the connected width (a) of the lugs 3 (connected with the edge of the electrode plate) to the width (b) of the flexible tongues 5. A ratio of about 5:1 is preferred. The electrode plates of the present invention are preferably produced by shaping the lugs 3 from the edges of the electrode plates, for example, by laser cutting or by stamping.

It will therefore be understood that various changes in the details, materials and arrangement of parts which have been herein described and illustrated in order to explain the nature of this invention may be made by those skilled in the art within the principle and scope of the invention as expressed in the following claims.

What is claimed is:

1. A prismatic galvanic cell comprising a plurality of electrode plates separated by separators, and terminal posts for electrically connecting the electrode plates, wherein each of the electrode plates has a current tapping lug extending from an edge of the plate which includes a flexible tongue extending parallel to the plate edge, wherein portions of the flexible tongue are separated from the plate edge by a recess, and wherein the separated portions of the flexible tongue are connected to one of the terminal posts.

2. The cell of claim 1 wherein the electrode plates include positive plates and negative plates, wherein the current tapping lugs of the negative plates and the current tapping lugs of the positive plates extend from center portions of upper edges of the plates, and wherein the current tapping lugs of the negative plates extend toward a first side of the electrode plates and the current tapping lugs of the positive plates extend toward a second side of the electrode plates opposite to the first side.

3. The cell of claim 2 wherein the electrode plates have a width and a height, and wherein the plate width defines a ratio with the plate height which is less than or equal to 1.

4. The cell of claim 1 wherein the electrode plates include positive plates and negative plates, and wherein the current tapping lugs of the negative plates extend from a first side of the electrode plates and the current tapping lugs of the positive plates extend from a second side of the electrode plates opposite to the first side.

5. The cell of claim 4 wherein the electrode plates have a width and a height, and wherein the plate width defines a ratio with the plate height which is greater than or equal to 1.

6. The cell of claim 1 wherein the recess at the plate edge is wider near the connection of the flexible tongue and the terminal post.

7. The cell of claim 1 wherein the current tapping lug is integral with the electrode plate.

8. The cell of claim 1 wherein the current tapping lug is formed of a current conducting material affixed to the electrode plate.

9. The cell of claim 1 wherein the edge of the electrode plate has a length, and wherein the flexible tongue of the current tapping lug has a length of about ⅓ to ⅘ of the length of the plate edge.

10. The cell of claim 1 wherein the flexible tongue extends from the plate edge along a connecting width, wherein the flexible tongue has a width, and wherein the ratio of the connecting width to the width of the flexible tongue is about 5:1.

11. The cell of claim 1 wherein the flexible tongue is welded to the terminal post.

12. A process for producing the cell of claim 1, comprising the step of cutting the current tapping lugs from the edges of the electrode plates.

13. The process of claim 12 wherein the cutting is laser cutting.

14. The process of claim 12 wherein the cutting is stamping.

15. A process for producing the cell of claim 1, comprising the step of connecting the flexible tongues to the terminal posts by ultrasonic welding.

16. The cell of claim 1, wherein the electrode plates are one of rolled expanded metal electrodes, formed of copper, nickel, nickel-plated steel, or aluminum, and foam or felt electrodes, formed of nickel, nickel-plated copper, or nickel-plated steel.

* * * * *